June 10, 1952  E. J. ROTH  2,600,075
AUTOMATIC DOUGHNUT FORMER
Filed Nov. 20, 1947  3 Sheets-Sheet 1
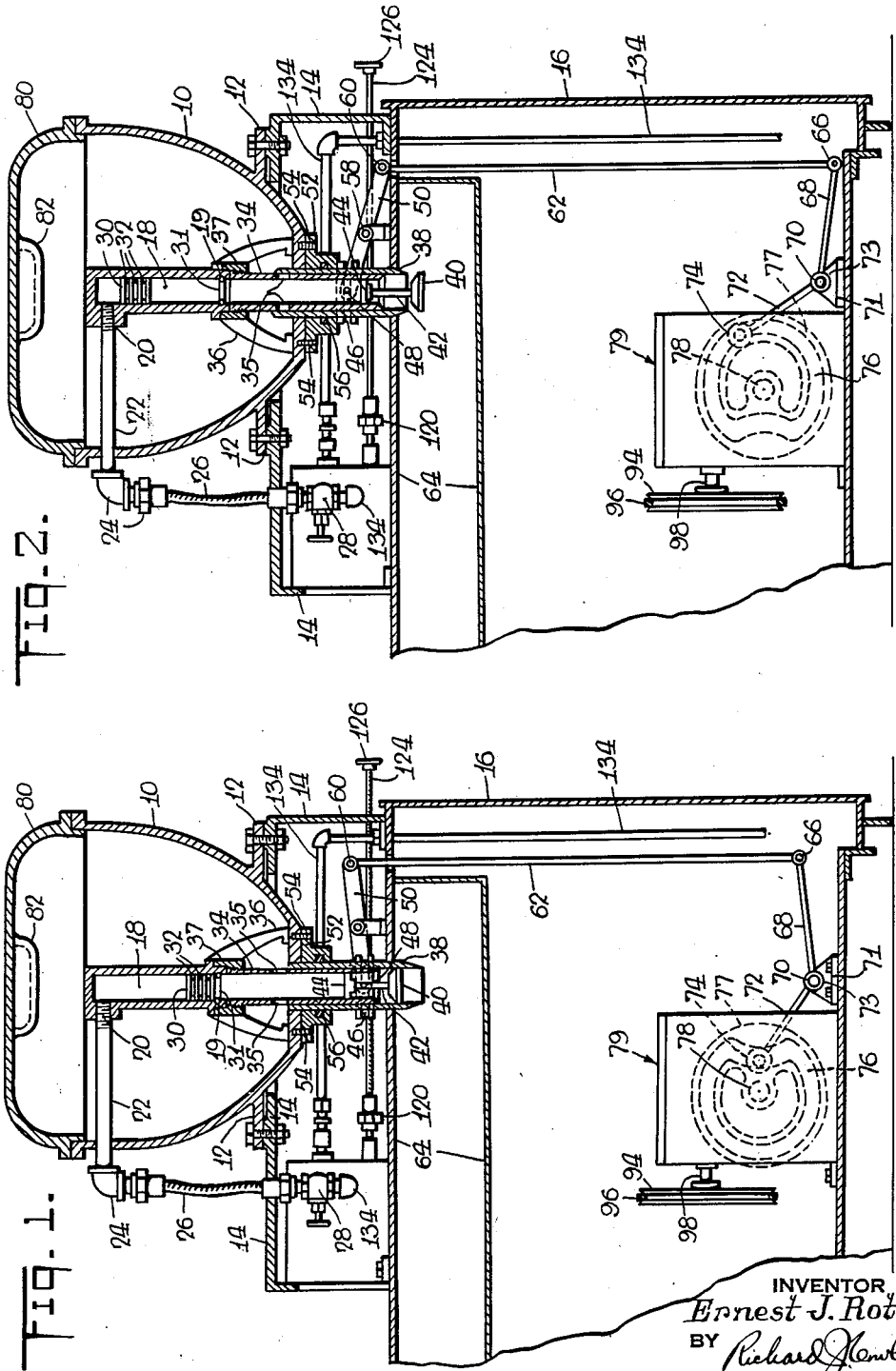
INVENTOR
Ernest J. Roth
BY Richard J. Newling
ATTORNEY June 10, 1952 E. J. ROTH 2,600,075
AUTOMATIC DOUGHNUT FORMER
Filed Nov. 20, 1947 3 Sheets-Sheet 2
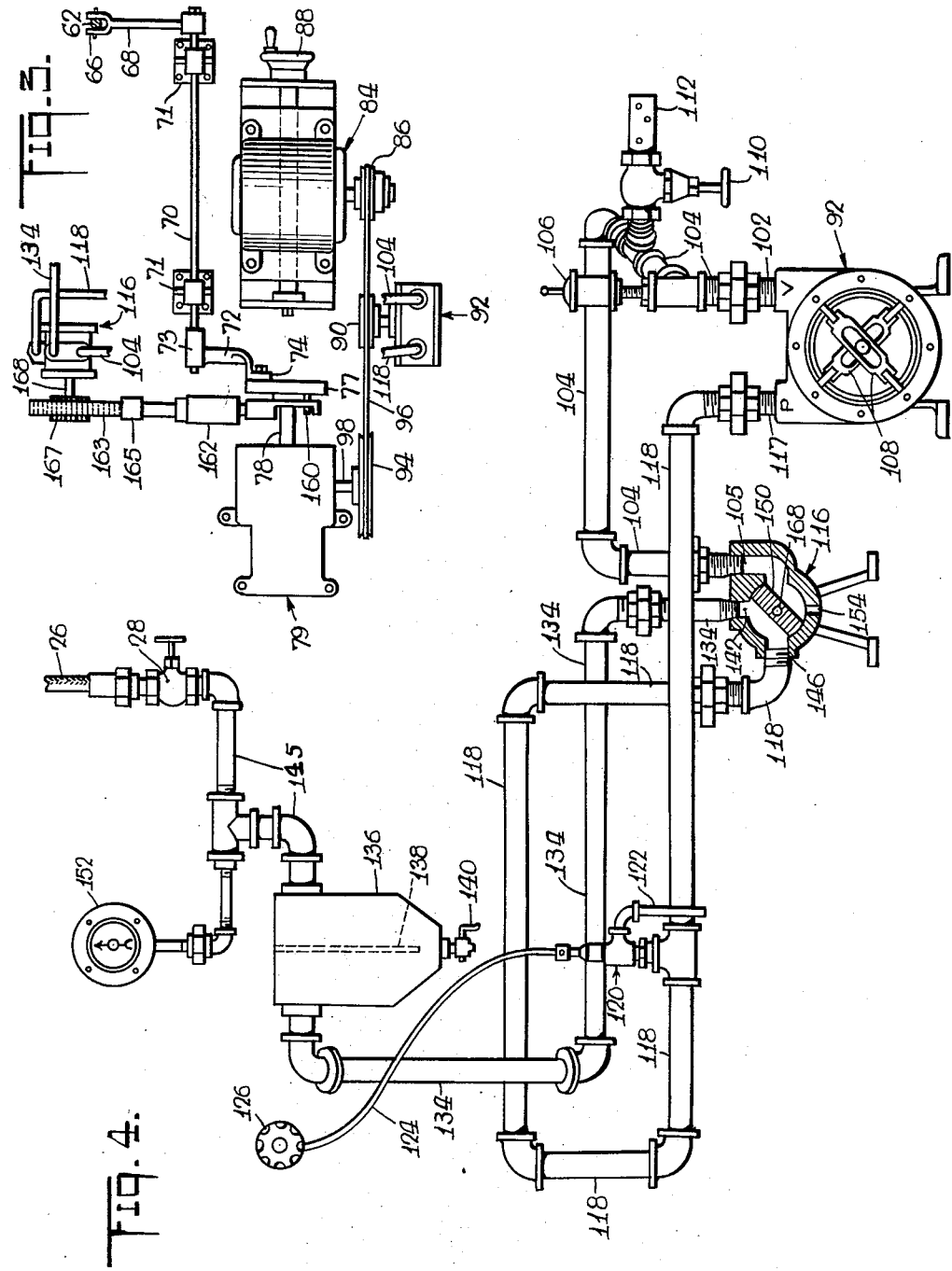
INVENTOR
Ernest J. Roth
BY
ATTORNEY June 10, 1952 E. J. ROTH 2,600,075
AUTOMATIC DOUGHNUT FORMER
Filed Nov. 20, 1947 3 Sheets-Sheet 3

INVENTOR.
Ernest J. Roth
BY Richard J. Newling
ATTORNEY

Patented June 10, 1952

2,600,075

UNITED STATES PATENT OFFICE 2,600,075

AUTOMATIC DOUGHNUT FORMER

Ernest J. Roth, Rockleigh, N. J., assignor to Joe Lowe Corporation, New York, N. Y., a corporation of Delaware Application November 20, 1947, Serial No. 787,087

3 Claims. (Cl. 107—14)

The present invention relates generally to an automatic doughnut former, and it has particular relation to a former of the vacuum-pressure type.

An object of the present invention is to provide a small, compact and low capacity doughnut former which is simple, efficient and relatively inexpensive to construct and operate.

Another object of the invention is the provision of a vacuum-pressure type of extruder or former which is operable from the driving mechanism of the cooking apparatus with which the same is to be associated in timed sequences.

A further object of the invention is to provide suitable simple, efficient and inexpensive means for preventing the raw dough from being drawn into the vacuum lines beyond the dough hopper in the event the former is permitted to operate over an extended period of time in an idle condition, i. e., with no dough forms being extruded.

Another object of the invention is the provision of a four-way control valve for controlling the vacuum and pressure to the dough hopper.

A further object of the invention is to provide a simple, efficient and inexpensive driving mechanism for operating the doughnut former in proper timed sequence with a conveyor operating through a dough cooking vessel or tank.

Various other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, wherein like numerals indicate like parts, in which:

Figure 1 is a fragmentary transverse vertical sectional view of a doughnut cooking machine, said view being reversed end-for-end and showing a doughnut former mounted in operative association therewith, in which the cutting die is shown in a closed position;

Figure 2 is a similar fragmentary vertical sectional view of the doughnut cooking machine shown in Figure 1, in which the cutting die of the doughnut former is shown in its open or extruding position;

Figure 3 is a fragmentary diagrammatic plan view of the driving mechanism for the doughnut machine and former;

Figure 4 is a perspective diagrammatic view, on a slightly larger scale, of the operating mechanism and piping for the vacuum-pressure system of the machine;

Figure 5:
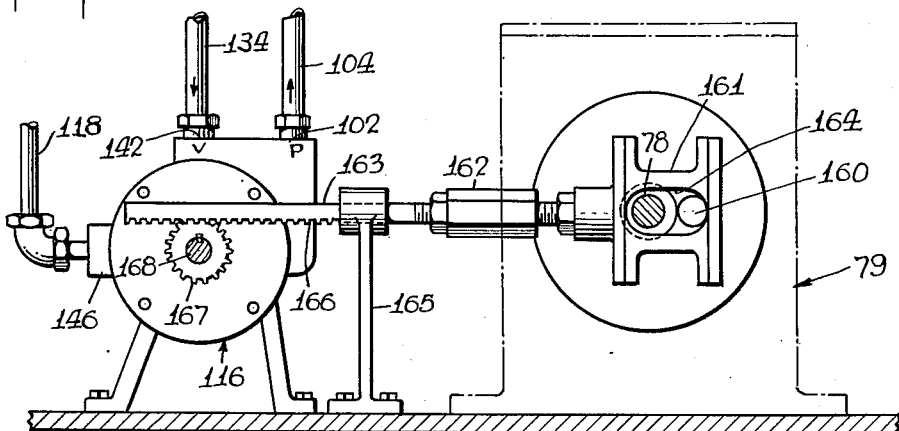
Figure 5 is a fragmentary diagrammatic view of the driving mechanism for the alternating four-way vacuum-pressure valve.

Referring now to the drawings, and particularly to Figures 1 and 2 thereof, there is shown a hopper 10, having integrally formed side flanges 12 for mounting on the supporting structure 14 of a conventional cooking vessel or tank 16. The hopper 10 has an axially mounted dispensing chamber 18, which is provided adjacent its top end with an internally threaded lateral opening 20 for receiving a vacuum-pressure pipe 22, which, in turn, is connected through suitable fittings 24 to a flexible hose 26, having a conventional valve 28 mounted on its opposite end for cutting off the air and vacuum whenever the machine is being idled for any length of time. When the former is idling, i. e., operating without cutting and discharging dough forms, the dough in the hopper 10 tends to be drawn upwardly into the chamber 18 and into the line 22 of the vacuum-pressure system, thereby eventually clogging the same. To prevent clogging of the line 22, there is mounted slidably within the chamber 18 a gravity piston 30. A fixed conventional split piston ring 31 is mounted within the chamber 18 in a recess 19 adjacent its lower end to prevent the piston 30 from dropping out when the chamber 18 is removed from the hopper 10 for cleaning purposes. The piston 30 is of such size and shape as to be slidable freely in the chamber 18, and is provided with a series of vertically spaced circumferentially extending slots or grooves 32. It does not completely seal off the lower end of the chamber 18 when it gravitates downwardly to the position shown in Figure 1, but it is so designed as to seal off the pipe line 22 when the same is carried upwardly by the rising dough drawn thereinto, thereby preventing the dough from being drawn into the pipe line 22 on the vacuum stroke of the system. When the piston 30 is forced into sealing position over the inlet opening 20 at the top of the chamber 18 by rising with the dough, the air-pressure in the line 22 will tend to increase and eventually blow the piston downwardly, thereby forcing all of the dough out of the chamber 18 back into the hopper 10. This cycle of operation will repeat itself indefinitely without permitting the dough to close the line 22 and thereby causing the machine to be shut down for an indefinite period of time while the same is dismantled for cleaning purposes.

The dough chamber 18 has a sleeve 34 mounted in axial alignment therewith contiguous to its lower end, which sleeve 34 extends downwardly through and beyond the bottom of the hopper 10. The contiguous ends of the chamber 18 and the sleeve 34 are fastened by means of a spider 36 mounted fixedly within the hopper 10. The spider 36 has an internally threaded collar 37 into which the upper end of the sleeve 34 is screw-threaded. It will be obvious that, in this arrangement, the sleeve 34 is mounted removably within the hopper 10 and can be withdrawn readily for cleaning purposes. The sleeve 34 has a series of dough ports 35 opening into the lower end of the hopper 10, which permits passage of the dough from the hopper 10 into the sleeve 34.

The lower end of the sleeve 34 is beveled outwardly, and an axial sleeve cutter 38 is mounted slidably thereon. A forming or cutting disc 40 is mounted in spaced relation relative to the open end of the sleeve 34 by means of a central stem 42, which is secured in the hub of a spider 44. The sleeve cutter 38 includes an annular channel 46 within which pin 48, forming a part of a lever arm 50, is inserted for imparting axial sliding movement to said sleeve cutter 38 under control of said lever arm 50. The hopper 10 and chamber 18 may be formed of any relatively light and soft non-tarnishing metal, such as aluminum. The inner sleeve 34 may be made of cast iron, but the sleeve cutter 38 should be made of steel. A flanged collar 52 is mounted by bolts 54 to the bottom of the hopper 10 to provide a suitable channel guide for the sleeve cutter 38. The collar 52 has a sealing ring 56 embedded in its axial opening to prevent leakage of the dough from the hopper 10 as the sleeve cutter 38 is actuated therein. The lever arm 50 is fulcrumed on a shaft 58, and has its outer end connected pivotally, as indicated at 60, to a connecting rod 62, which passes downwardly through the top of the frying tank 64 to connect pivotally, as indicated at 66, to a rocker arm 68. The opposite end of the rocker arm 68 is keyed to a rocker shaft 70, which is mounted in suitably spaced bearing supports 71, and has a cam lever 72 keyed to its other end, as indicated at 73. The free end of the cam lever 72 is, in turn, fixedly secured to a cam follower 74 operating in the track 76 of an eccentric track cam 77. The track cam 77 is keyed to a shaft 78 of a conventional reduction gear 79.

A removable cover 80, having a recessed handle 82, is adapted to fit over the open top of the hopper 10, as best shown in Figures 1 and 2, closing and sealing the same from the atmosphere.

The operating or driving mechanism for the dough former is best understood by considering Figures 1, 2 and 3. Referring first to Figure 3, the unit consists essentially of an electric motor 84 driven from a suitable source of electrical energy (not shown). The motor 84 is provided with a conventional variable speed grooved driving pulley 86, which is adjustable in a well known manner by means of an adjustment wheel 88. The driving pulley 86 of the motor 84 is coupled to a grooved pulley 90 of a conventional vacuum-pressure pump 92 and also to a grooved pulley 94 of a conventional reduction gear box 79 by means of a driving belt 96. The grooved pulley 94 is mounted fixedly on a shaft 98 of the reduction gear box 79. The reduction gear box 79 also has a driving shaft 78 provided with the keyed driving track cam 77, which operates the cam follower 74 and through the crank arm 72, rocker shaft 70, rocker arm 68, connecting rod 62 and lever 50 actuates the cutter sleeve 38.

The pneumatic system is best shown diagrammatically in Figure 4. The input or vacuum side 102 of the pump 92 is connected by a pipe 104 with a vacuum inlet port 105 of an alternating four-way valve 116. An oil drip cup 106 supplies sufficient oil to the pump 92 to lubricate the rotor vanes 108. A hand valve 110 is mounted in the pipe line 104 between the open ended perforated intake 112 and the pipe leading into the input or vacuum side of the pump 92. The degree of vacuum created in the pipe line 104 is controlled by the valve 110, which permits incoming air to by-pass the input or vacuum side 102 of the pump 92 to permit regulation of the vacuum so that the plastic dough will not be drawn readily into the vacuum system. The vacuum line 104 leads from the input side 102 of the pump 92 to the vacuum inlet port 105 of the alternating valve 116. The pressure side 117 of the pump 92 is connected by means of a pipe 118 to the pressure inlet port 146 of the four-way valve 116, and has a pressure regulating valve 120 mounted therein. The valve 120 is provided with an exhaust port 122, and is regulated through a flexible cable 124 by means of a regulating knob 126.

Figure 6:
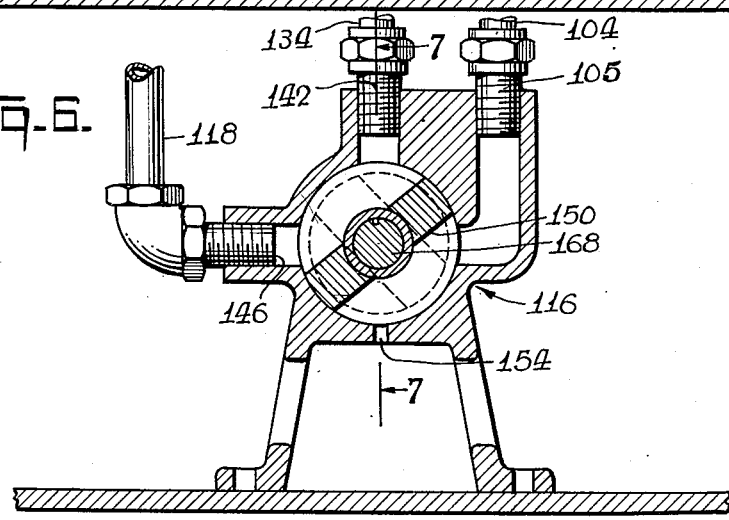
Figure 6 is an enlarged vertical sectional view of the four-way vacuum-pressure valve shown in Figure 5.
Figure 7:
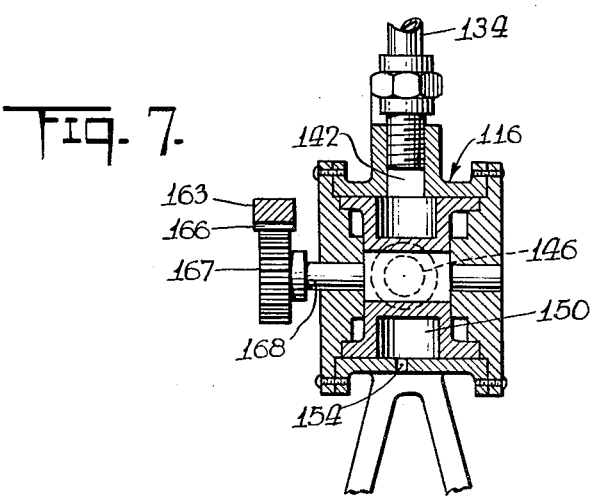
Figure 7 is a cross-sectional view of the four-way vacuum-pressure valve shown in Figure 6, the same having been taken substantially along the line 7—7 thereof, looking in the direction of the arrows.

The common vacuum-pressure port 142 of the alternating valve 116, shown best diagrammatically in Figure 4, is connected by the pipe 134 to a conventional oil trap 136, which is, in turn, connected by the pipe line 145, and through it, valve 28 and the hose 26 to the hopper 10. The oil trap 136 prevents oil from passing from the pump 92 through the vacuum-pressure delivery pipe 134 to the pipe line 145. Any oil entering the oil trap 136 is trapped by the baffle plate 138, and falls to the bottom thereof. The oil that collects in the bottom of the oil trap 136 may be drained therefrom by manually opening the drain cock 140. The alternating valve 116 is shown diagrammatically in Figure 4 with its alternator or vane 150 in its pressure stroke position. When the vane 150 is in its vacuum stroke position, which is the dotted line position shown in Figure 6, its ports 142 and 105 are in open communication with each other. A compound vacuum-pressure gauge 152 indicates all changes of pressure above or below atmospheric in the common vacuum-pressure pipe line 145. The four-way valve 116 is provided with an open bottom outlet or exhaust port 154, which prevents the building up of any back pressure in the system during the pressure periods of the operating cycle.

The alternating four-way valve 116 is operated from the reduction gear box 79 by means of a cam lug 160, as best shown in Figure 5. The cam lug 160 is formed integrally with the track cam 77 on its inner face adjacent the reduction gear box 79. An H-shaped valve shifter 161 is adapted to be associated operatively with the cam lug 160, and is provided with an adjustable link 162 for connecting with a horizontally mounted rack bar 163 (see Fig. 5). The valve shifter 161 is provided with an elongated aperture 164 to provide operating clearance for the drive shaft 78. A bearing support 165 serves to hold the link arm 162 and rack bar 163 in a horizontal plane.

The teeth 166 of the rack bar 163 are associated operatively with a rack wheel or pinion 167, which in turn is keyed to a shaft 168 of the four-way alternating valve 116. The reciprocating motion of the valve shifter 161 is imparted to the rack bar 163, causing the pinion 167 to rotate with a back or forth motion through a forty-five degree arc, thus causing the shaft 168 to oscillate, thereby moving alternator 150 of the valve 116 so as to alternately open and close the vacuum and pressure ports 105 and 146, respectively. The port 154 of the four-way valve 116 being open at all times to the atmosphere prevents the building-up of any back pressure in the system when the vacuum side of the pump 92 is in operation.

The operation of the former is as follows: At the beginning of the operating cycle (see Fig. 1), the sleeve cutter 38 has been moved to its downward limit of movement by the rocking action of the lever arm 50, which has been actuated by the connecting arm 62, rocker arm 68, rocker shaft 70, crank arm 72, and cam follower 74, which at that time occupies the eccentric or indented portion of the track cam 77 shown in Figure 1. The cam lug 160 is in contact with that portion of the valve shifter 161 shown in Figure 5, thus unsealing the valve port 146 and connecting the vacuum side of the pump 116 through the pipe lines 104, 134 and 145 to the dough chamber 10, which reduces the air pressure in the chamber 18 below atmospheric pressure. Due to the difference in pressure, the dough in the hopper 10 is drawn downwardly through the ports 35 into the lower part of the sleeve 34.

When the cam follower 74 is in the position shown in Figure 2, the sleeve cutter 38 has been moved upwardly to its upper limit of movement by the rocking action of the lever arm 50. In this position a quantity of dough in the form of a ring is forced out under pressure between the lower edge of the sleeve cutter 38 and the disc 40. The next downward movement of the cutter 38 severs the extruded dough portion (not shown) in a well known manner, forming a doughnut ring ready to be fried. When the dough is being extruded, the dough hopper 10 is obviously under pressure above atmospheric, and the four-way alternating valve 116 is in its full line position shown in Figure 6, with its pressure port 146 connected with the port 142. In this position, the vacuum port 102 is connected directly with the exhaust port 154, thereby preventing any back pressure being built-up in the system.

In the manufacture of doughnut forms, it is exceedingly difficult at times to regulate the amount of soft plastic dough taken into the cutting sleeve 38 with the amount of dough being extruded with each operation in the form of a raw dough ring. It is always better to take in a little more dough than is being extruded so as to insure the cutting of a full sized ring at all times. Manifestly, if the dough in the sleeve 34 tends to increase with each operation, it will eventually tend to rise in the chamber 18 and would tend to flow back into the line 22, thereby clogging the same. To remove any dough drawn into the line 22 requires that the machine be shut down and the line dismantled. The valve 28 is placed in the line 145 where it connects with the hose 26 to permit the line to be shut off in the event the machine is operated when no forms are being cut by the cutter, thereby preventing any unnecessary build-up of dough in the chamber 18.

The piston 30, which is mounted slidably in the chamber 18, is a protective measure to prevent the dough from being taken into the line 22 on the vacuum strokes of the machine. It is moved or carried upwardly by the rising dough in the chamber 18, and, when it is forced over the opening 20 of the line 22, it seals off said line from the chamber 18. The pressure stroke will tend to cause the piston 30 to be forced downwardly, and will eventually force most of the dough back into the chamber 18 through the ports 35. The piston ring 31 is mounted in the chamber 18 merely to prevent the piston from being lost when the dough hopper 10, chamber 18 and sleeve 34 are dismantled at the end of the day for cleaning purposes. This ring 31 insures that the piston 30 will not be left out when these parts are reassembled after cleaning.

Although I have described in detail only one form which the invention may assume, it will be readily understood by those skilled in the art that the same is not to be so limited, but that various modifications may be made therein without departing from the spirit thereof or from the scope of the appended claims.

What I claim is:

1. In an extrusion machine having a dough hopper including an inner sleeve defining a dough dispensing chamber having an inlet and an outlet through which the dough may be admitted and discharged, an axial cutter mounted slidably on said sleeve defining a valve for controlling alternately the opening and closing of said inlet, means for operating said cutter, and, in combination therewith, a pneumatic pumping system including a pump having a vacuum port and a pressure port alternately connected with said sleeve, a four-way valve having a pressure port, a vacuum port, an intake port and an exhaust port, a valve shifter, and means for operating said valve shifter whereby when the vacuum port of said pump is connected with said sleeve its pressure port is connected with said valve exhaust port and when the pressure port of said pump is connected with said sleeve its vacuum port is connected with said valve exhaust port.

2. In an extrusion machine having a dough hopper including an inner sleeve defining a dough dispensing chamber having an inlet and an outlet through which dough may be admitted and discharged, an axial cutter mounted slidably in said sleeve defining a valve for controlling alternately the opening and closing of said inlet, means for operating said cutter, and, in combination therewith, a pneumatic pumping system including a pump having a vacuum port and a pressure port alternately connected with said sleeve, a four-way valve having a pressure port, a vacuum port, an intake port and an exhaust port, a valve shifter, means for operating said valve shifter whereby when the vacuum port of said pump is connected to said sleeve its pressure port is connected with said valve exhaust port and when the pressure port of said pump is connected with said sleeve its vacuum port is connected with said valve exhaust port, and means mounted within said sleeve above said dough inlet for preventing the passage of dough into the vacuum connection.

3. In an extrusion machine having a dough hopper including an inner sleeve defining a dough dispensing chamber having an inlet and an outlet through which dough may be admitted and discharged, an axial cutter mounted slidably in said sleeve defining a valve for controlling alternately the opening and closing of said inlet, means for operating said cutter, and, in combination therewith, a pneumatic pumping system including a pump having a vacuum port and a pressure port alternately connected through a pipe line with said sleeve, a four-way valve having a pressure port, a vacuum port, an intake port and an exhaust port, a valve shifter, means for operating said valve shifter whereby when the vacuum port of said pump is connected to said sleeve its pressure port is connected with said valve exhaust port and when the pressure port of said pump is connected with said sleeve its vacuum port is connected with said valve exhaust port, and means including a freely slidable piston mounted in said sleeve above said inlet operable by the pressure in said connecting line when the dough has carried the same upwardly and caused a sealing off of said line by said piston.

ERNEST J. ROTH.

REFERENCES CITED

The following references are of record in the file of this patent:

UNITED STATES PATENTS

| Number | Name | Date |
| --- | --- | --- |
| 1,060,109 | McIntyre | Apr. 29, 1913 |
| 1,559,729 | Morris | Nov. 3, 1925 |
| 1,564,911 | Striefling | Dec. 8, 1925 |
| 1,993,609 | Kennedy | Mar. 5, 1935 |
| 2,317,897 | Ellis | Apr. 27, 1943 |